United States Patent
Zeine et al.

(10) Patent No.: US 10,517,127 B2
(45) Date of Patent: Dec. 24, 2019

(54) TECHNIQUES FOR ENCODING BEACON SIGNALS IN WIRELESS POWER DELIVERY ENVIRONMENTS

(71) Applicant: Ossia Inc., Bellevue, WA (US)

(72) Inventors: Hatem Ibrahim Zeine, Bellevue, WA (US); Prithvi Shylendra, Seattle, WA (US); Anas Alfarra, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 0 days.

(21) Appl. No.: 15/966,327

(22) Filed: Apr. 30, 2018

(65) Prior Publication Data

US 2018/0255596 A1    Sep. 6, 2018

Related U.S. Application Data

(63) Continuation of application No. 14/956,673, filed on Dec. 2, 2015, now Pat. No. 9,961,705.

(60) Provisional application No. 62/086,481, filed on Dec. 2, 2014.

(51) Int. Cl.
  *H04W 76/14* (2018.01)
  *H04L 5/00* (2006.01)
  *H02J 50/80* (2016.01)

(52) U.S. Cl.
  CPC .............. *H04W 76/14* (2018.02); *H02J 50/80* (2016.02); *H04L 5/0051* (2013.01); *H04L 5/0026* (2013.01)

(58) Field of Classification Search
  CPC ........ H04W 76/14; H02J 50/80; H04L 5/0051
  See application file for complete search history.

(56) References Cited

U.S. PATENT DOCUMENTS

| | | | |
|---|---|---|---|
| 4,951,263 | A | 8/1990 | Shope |
| 6,346,912 | B1 | 2/2002 | Reinhart et al. |
| 8,547,057 | B2 | 10/2013 | Dunworth et al. |

(Continued)

FOREIGN PATENT DOCUMENTS

| | | |
|---|---|---|
| JP | 2011-193707 A | 9/2011 |
| KR | 2009-0118094 A | 11/2009 |

(Continued)

OTHER PUBLICATIONS

European Patent Application No. EP15864640.6, Extended European Search Report, 8 pages, dated Jul. 3, 2018.

(Continued)

*Primary Examiner* — Thomas J. Hiltunen

(57) ABSTRACT

Embodiments of the present disclosure describe techniques for encoding beacon signals in wireless power delivery environments. More specifically, techniques are disclosed for encoding beacon signals to isolate client devices for wireless power delivery in wireless power delivery environments. The beacon signals can be encoded or modulated with a transmission code that is provided to selected clients in the wireless power delivery environment. In this manner, beacon signals from the select clients can be identified and the corresponding client devices isolated for wireless power delivery. In some embodiments, the transmission code can be a pseudorandom sequence that is used by the wireless power delivery clients to encode transmitted beacon signals.

20 Claims, 11 Drawing Sheets

(56) References Cited

U.S. PATENT DOCUMENTS

| | | | |
|---|---|---|---|
| 8,686,685 B2* | 4/2014 | Moshfeghi | H02J 50/20 |
| | | | 320/108 |
| 9,160,421 B2 | 10/2015 | Kim et al. | |
| 9,461,502 B2 | 10/2016 | Lee et al. | |
| 9,461,712 B2* | 10/2016 | Miyabayashi | H04B 5/0037 |
| 9,602,169 B2 | 3/2017 | Nago | |
| 10,078,125 B2* | 9/2018 | Newman | H04W 4/80 |
| 2002/0141375 A1 | 10/2002 | Choi | |
| 2005/0281318 A1 | 12/2005 | Neugebauer | |
| 2009/0163216 A1 | 6/2009 | Hoang et al. | |
| 2010/0034238 A1 | 2/2010 | Bennett | |
| 2010/0289341 A1 | 11/2010 | Ozaki et al. | |
| 2011/0156640 A1* | 6/2011 | Moshfeghi | H02J 50/20 |
| | | | 320/108 |
| 2012/0206096 A1 | 8/2012 | John | |
| 2013/0287041 A1 | 10/2013 | Yonge, III et al. | |
| 2014/0194084 A1 | 7/2014 | Noonan et al. | |
| 2014/0217967 A1 | 8/2014 | Zeine et al. | |
| 2014/0312833 A1 | 10/2014 | Won et al. | |
| 2015/0194838 A1 | 7/2015 | Won et al. | |
| 2015/0380974 A1 | 12/2015 | Lin et al. | |
| 2016/0233728 A1 | 8/2016 | Park et al. | |
| 2016/0301238 A1 | 10/2016 | Khoshvenis | |
| 2016/0380488 A1 | 12/2016 | Widmer et al. | |
| 2017/0063168 A1 | 3/2017 | Uchida | |
| 2017/0185126 A1 | 6/2017 | Trethewey | |
| 2017/0207663 A1 | 7/2017 | Park et al. | |
| 2017/0207667 A1 | 7/2017 | Shimokawa | |
| 2019/0074726 A1* | 3/2019 | Hosotani | H02J 50/80 |

FOREIGN PATENT DOCUMENTS

| | | |
|---|---|---|
| KR | 2012-0099466 A | 9/2012 |
| WO | 2014/021619 A2 | 2/2014 |
| WO | 2016/178417 A1 | 11/2016 |

OTHER PUBLICATIONS

Korean Patent Application No. 2017-7018231, Notice of Allowance, 3 pages, dated Dec. 6, 2018.
Japanese Patent Application No. 2017-528929, Office Action, 9 pages, dated May 22, 2018.
Chinese Patent Application No. 201580075112.6, Office Action, 26 pages, dated Nov. 2, 2018.

* cited by examiner

TECHNIQUES FOR ENCODING BEACON SIGNALS IN WIRELESS POWER DELIVERY ENVIRONMENTS

CROSS-REFERENCE TO RELATED APPLICATIONS

This application is a continuation of U.S. patent application Ser. No. 14/956,673 titled "TECHNIQUES FOR ENCODING BEACON SIGNALS IN WIRELESS POWER DELIVERY ENVIRONMENTS" filed on Dec. 2, 2015, now allowed; which claims priority to and benefit from U.S. Provisional Patent Application No. 62/086,481 titled "TECHNIQUES FOR IDENTIFYING CLIENTS AND CHARGERS IN WIRELESS POWER ENVIRONMENTS" filed on Dec. 2, 2014, which is expressly incorporated by reference herein.

BACKGROUND

Signal transmission between wireless chargers and client devices in a wireless power delivery environment can be challenging. For example, client devices can periodically transmit beacon signals or other signaling to a wireless charger so that the wireless charger can specifically direct wireless power to the client device. Unfortunately, when there are multiple client devices in the same environment, the wireless charger may inadvertently direct power to an unauthorized or incorrect wireless device. That is, the wireless charger may inadvertently lock onto an unauthorized transmission source (e.g., another wireless device or other transmitter) that is transmitting at the same frequency as the wireless device resulting in wireless power being directed to the unauthorized transmission source rather than the intended wireless device.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
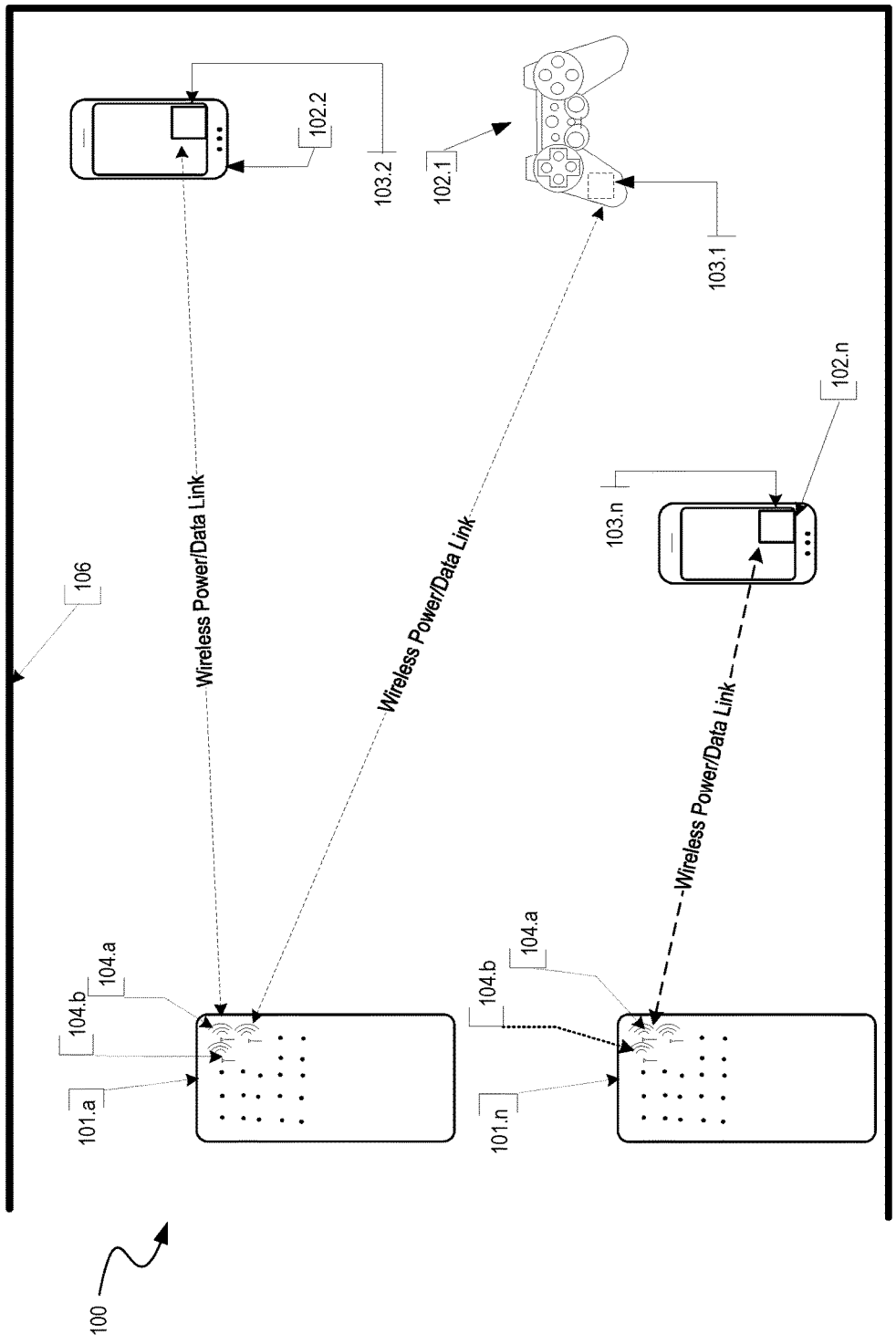
FIG. 1 depicts a block diagram illustrating an example wireless power delivery environment depicting isolated wireless power delivery from one or more wireless chargers to various wireless devices within the wireless power delivery environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe techniques for encoding beacon signals in wireless power delivery environments. More specifically, techniques are disclosed for encoding beacon signals to isolate client devices for wireless power delivery in wireless power delivery environments. The beacon signals can be encoded or modulated with a transmission code that is provided to selected clients in the wireless power delivery environment. In this manner, beacon signals from the select clients can be identified and the corresponding client devices isolated for wireless power delivery. In some embodiments, the transmission code can be a pseudorandom sequence that is used by the wireless power delivery clients to encode transmitted beacon signals.

In some embodiments, the same transmission code is used for all clients (transmission code unique to charger). In other embodiments, a different transmission code is provided to each client or communication path. As discussed in more detail with reference to FIG. 7, different transmission codes for each client can facilitate simultaneous or near simultaneous transmission of beacon signaling by the clients in the wireless power delivery environment further ensuring that only authorized (selected) clients are "locked" by the wireless power delivery system.

In some embodiments, the techniques illustrated herein achieve, among other things, accurate identification and tracking of clients by chargers (e.g., "locking") in wireless power delivery environments. The accurate identification prevents locking onto unauthorized sources.

By way of example and not limitation, the beacon encoding techniques described herein can be used in various industrial, military, counter terrorism applications, conservation of energy, quality of environment and medical applications, etc. that can require having more than one charger to deliver power and identify many authorized wireless devices in the same environment without interference.

FIG. 1 is a diagram illustrating an example wireless power delivery environment 100 depicting isolated wireless power delivery from one or more wireless chargers 101 to various wireless devices 102 within the wireless power delivery environment 100. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive isolated wireless power from one or more wireless chargers 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. As discussed herein, the one or more integrated power receiver clients or "wireless power receivers" receive and process power from one or more transmitters/chargers 101.a-101.n and provide the power to the wireless devices 102.1-102.n for operation thereof.

Each charger 101 (also referred to herein as a "transmitter", "array of antennas" or "antenna array system") can include multiple antennas 104, e.g., an antenna array including hundreds or thousands of antennas, which are capable of delivering wireless power to wireless devices 102. In some embodiments, the antennas are adaptively-phased radio frequency antennas. The charger 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems. In some embodiments, the charger 101 can have an embedded Wi-Fi hub.

The wireless devices 102 can include one or more receive power clients 103. As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to and receive data communications from the power receiver clients 103.1-103 and/or the wireless devices 102.1-102.n. In some embodiments, the data communication antennas can communicate via Bluetooth, Wi-Fi, ZigBee, etc.

Each power receiver client 103.1-103.n includes one or more antennas (not shown) for receiving signals from the chargers 101. Likewise, each charger 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing the complex conjugate of a received beacon signal at each antenna of the array such that the coherent signal is properly phased for the particular power receiver client that transmitted the beacon signal.

Although not illustrated, each component of the environment, e.g., wireless power receiver, charger, etc., can include control and synchronization mechanisms, e.g., a data communication synchronization module. The chargers 101.a-101.n can be connected to a power source such as, for example, a power outlet or source connecting the chargers to a standard or primary alternating current (AC) power supply in a building. Alternatively or additionally, one or more of the chargers 101.a-101.n can be powered by a battery or via other mechanisms.

In some embodiments, the power receiver clients 102.1-102.n and/or the chargers 101.a-101.n utilize reflective objects 106 such as, for example, walls or other RF reflective obstructions within range to transmit beacon signals and/or receive wireless power and/or data within the wireless power delivery environment. The reflective objects 106 can be utilized for multi-directional signal communication regardless of whether a blocking object is in the line of sight between the charger and the power receiver client.

As described herein, each wireless device 102.1-102.$n$ can be any system and/or device, and/or any combination of devices/systems that can establish a connection with another device, a server and/or other systems within the example environment 100. In some embodiments, the wireless devices 102.1-102.$n$ include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the charger 101 and the power receiver clients 103.1-103.$n$ can each include a data communication module for communication via a data channel. Alternatively or additionally, the power receiver clients 103.1-103.$n$ can direct the wireless devices 102.1-102.$n$ to communicate with the charger via existing data communications modules. Additionally, in some embodiments the beacon signal, which is primarily referred to herein as a continuous waveform, can alternatively or additionally take the form of a modulated signal.

Figure 2:
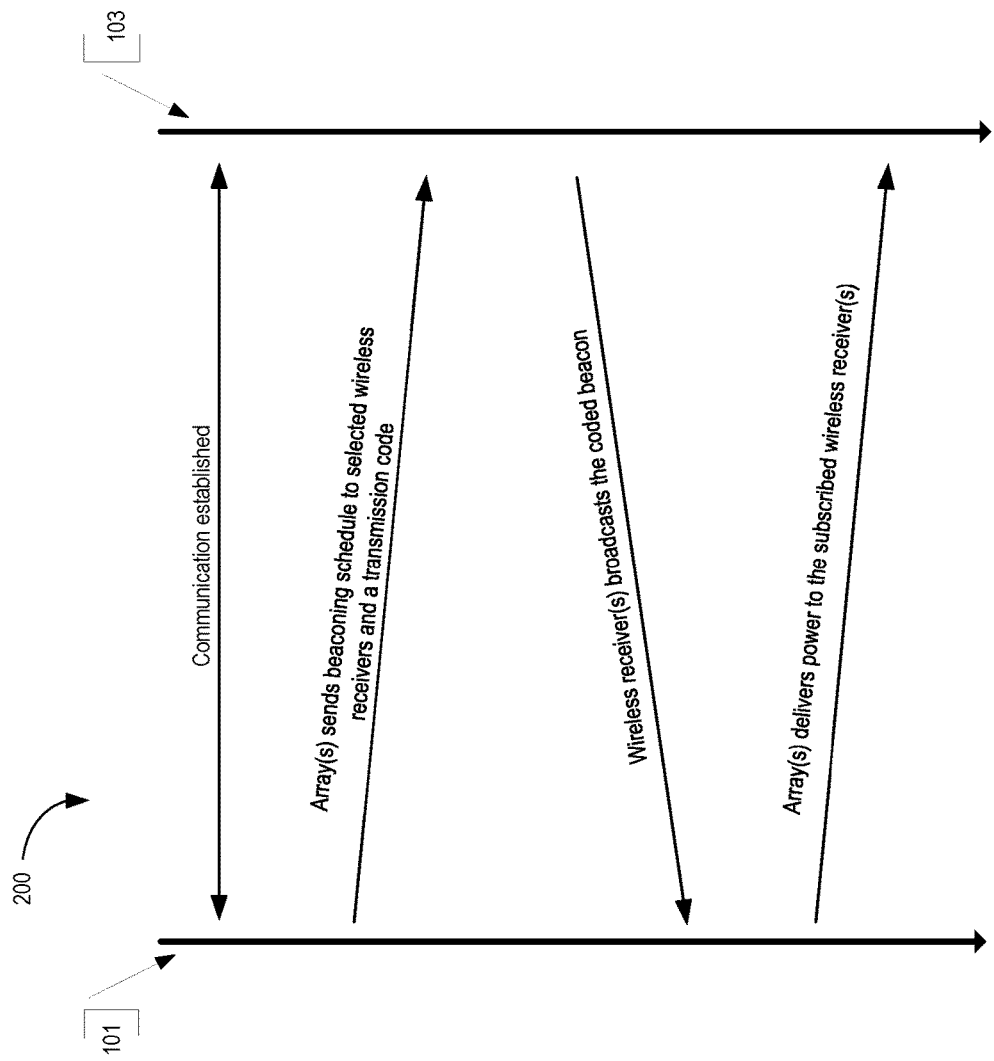
FIG. 2 depicts a sequence diagram illustrating example operations between a wireless charger and a wireless receiver device for commencing isolated wireless power delivery in accordance with some embodiments.

FIG. 2 is a sequence diagram 200 illustrating example operations between a wireless charger 101 and a power receiver client 103 for commencing isolated wireless power delivery, according to an embodiment. Initially, communication is established between the charger 101 and the power receiver client 103. The charger 101 subsequently sends beacon schedule information and a transmission code to the power receiver client 103 to facilitate encoding of the beacon signal by the power receiver client 103 for subsequent isolated wireless power delivery by the charger. The charger 101 can also send power transmission scheduling information so that the power receiver client 103 knows when to expect wireless power from the charger. As discussed herein, the power receiver client 103 generates an encoded beacon signal using the transmission code and broadcasts the encoded beacon during a beacon transmission assignment indicated by the beacon schedule information, e.g., BBS cycle.

As shown, the charger 101 receives the beacon from the power receiver client 103 and decodes the encoded beacon signal using the transmission code provided to the client 103 to ensure that the client 103 is an authorized or selected client. The charger 101 also detects the phase (or direction) at which the beacon signal is received and, once the charger determines that the client is authorized, delivers wireless power and/or data to the power receiver client 103 based the phase (or direction) of the received beacon. In some embodiments, the charger 101 can determine the complex conjugate of the phase and use the complex conjugate to deliver and/or otherwise direct wireless power to the power receiver client 103 in the same direction (or phase) in which the beacon signal was received from the power receiver client 103.

In some embodiments, the charger 101 includes many antennas; one or more of which are used to deliver power to the power receiver client 103. The charger 101 can detect phases at which the beacon signals are received at each antenna. The large number of antennas may result in different coded beacon signals being received at each antenna of the charger 101. The charger may then determine the complex conjugate of the beacon signals received at each antenna. Using the complex conjugates, one or more antenna may emit a signal that takes into account the effects of the large number of antennas in the charger 101. In other words, the charger 101 emits a signal from one or more antennas in such a way as to create an aggregate signal from the one or more of the antennas that approximately recreates the waveform of the beacon in the opposite direction.

As discussed herein, wireless power can be delivered in power cycles defined by power schedule information. A more detailed example of the signaling required to commence wireless power delivery is described now with reference to FIG. 3.

Figure 3:
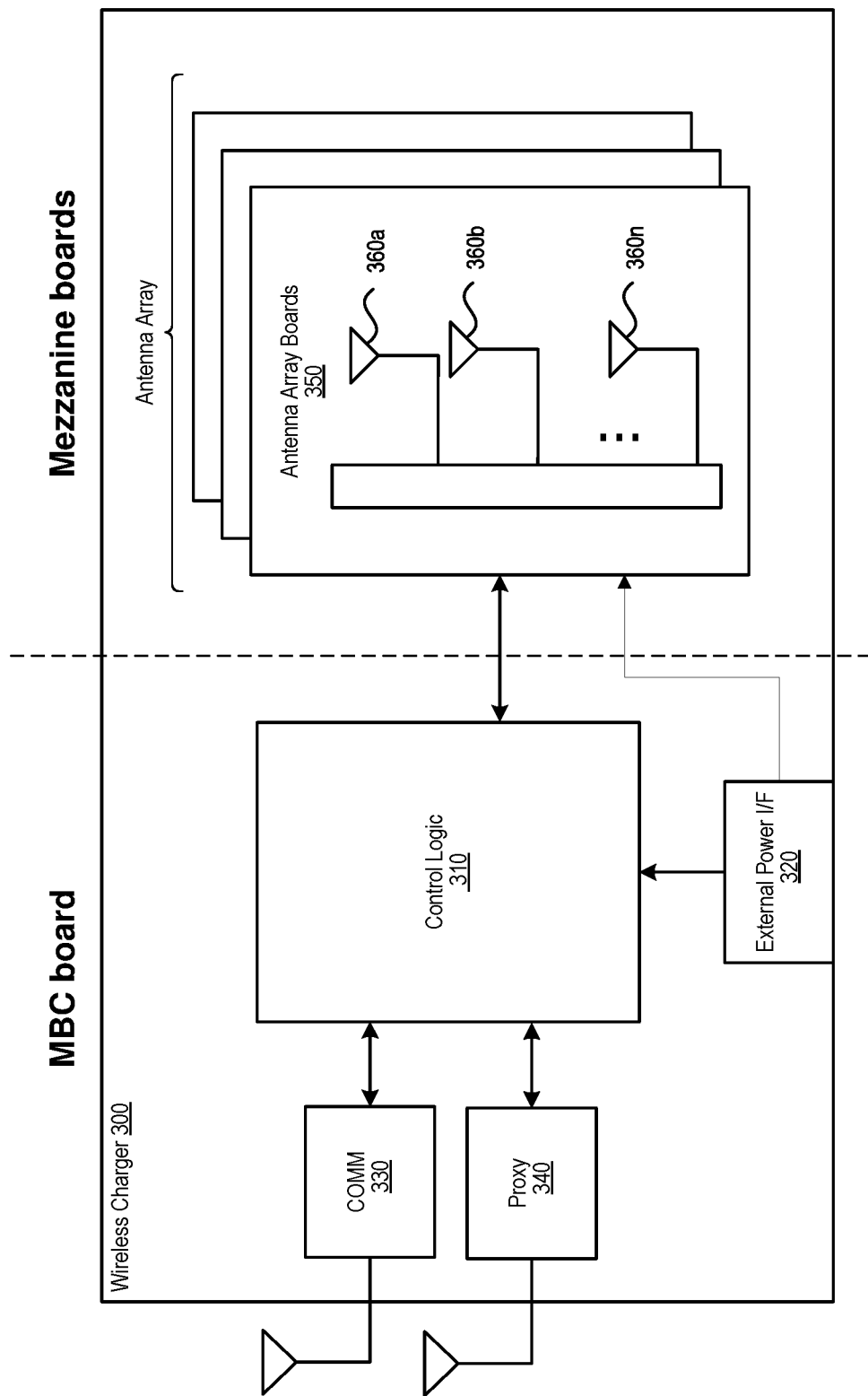
FIG. 3 depicts a block diagram illustrating example components of a wireless power transmitter (charger or wireless power delivery system) in accordance with some embodiments.

FIG. 3 is a block diagram illustrating example components of a wireless charger 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external power interface (I/F) 320, a communication block 330, and proxy 340. The mezzanine (or antenna array boards 350) each include multiple antennas 360$a$-360$n$. Some or all of the components can be omitted in some embodiments. Additional components are also possible.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, ZigBee, etc. Likewise, the proxy 340 can communicate with clients via data communications as discussed herein. The data communications can be Bluetooth, Wi-Fi, ZigBee, etc. The external power interface 320 is configured to receive external power and provide the power to various components. In some embodiments, the external power interface 320 may be configured to receive a standard external 24 Volt power supply. Alternative configurations are also possible.

An example of a system power cycle is now described. In this example, the master bus controller (MBC), which controls the charger array, first receives power from a power source and is activated. The MBC then activates the proxy antenna elements on the charger array and the proxy antenna elements enter a default "discovery" mode to identify available wireless receiver clients within range of the charger array. When a client is found, the antenna elements on the charger array power on, enumerate, and (optionally) calibrate.

Next, the MBC generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. A graphical signaling representation of an example BBS and PS is shown and discussed in greater detail with reference to FIGS. 6 and 7. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise the PS indicates when and to which clients the array should send power to. Each client starts broadcasting its beacon and receiving power from the array per the BBS and PS. The Proxy can concurrently query the Client Query Table to check the status of other available clients. A client can only exist in the BBS or the CQT (e.g., waitlist), but not in both. In some embodiments, a limited number of clients can be served on the BBS and PS (e.g., 32). Likewise, the CQT may also be limited to a number of clients (e.g., 32). Thus, for example, if more than 64 clients are within range of the charger, some of those clients would not be active in either the BBS or CQT. The information collected in the previous step continuously and/or periodically updates the BBS cycle and/or the PS.

Figure 4:
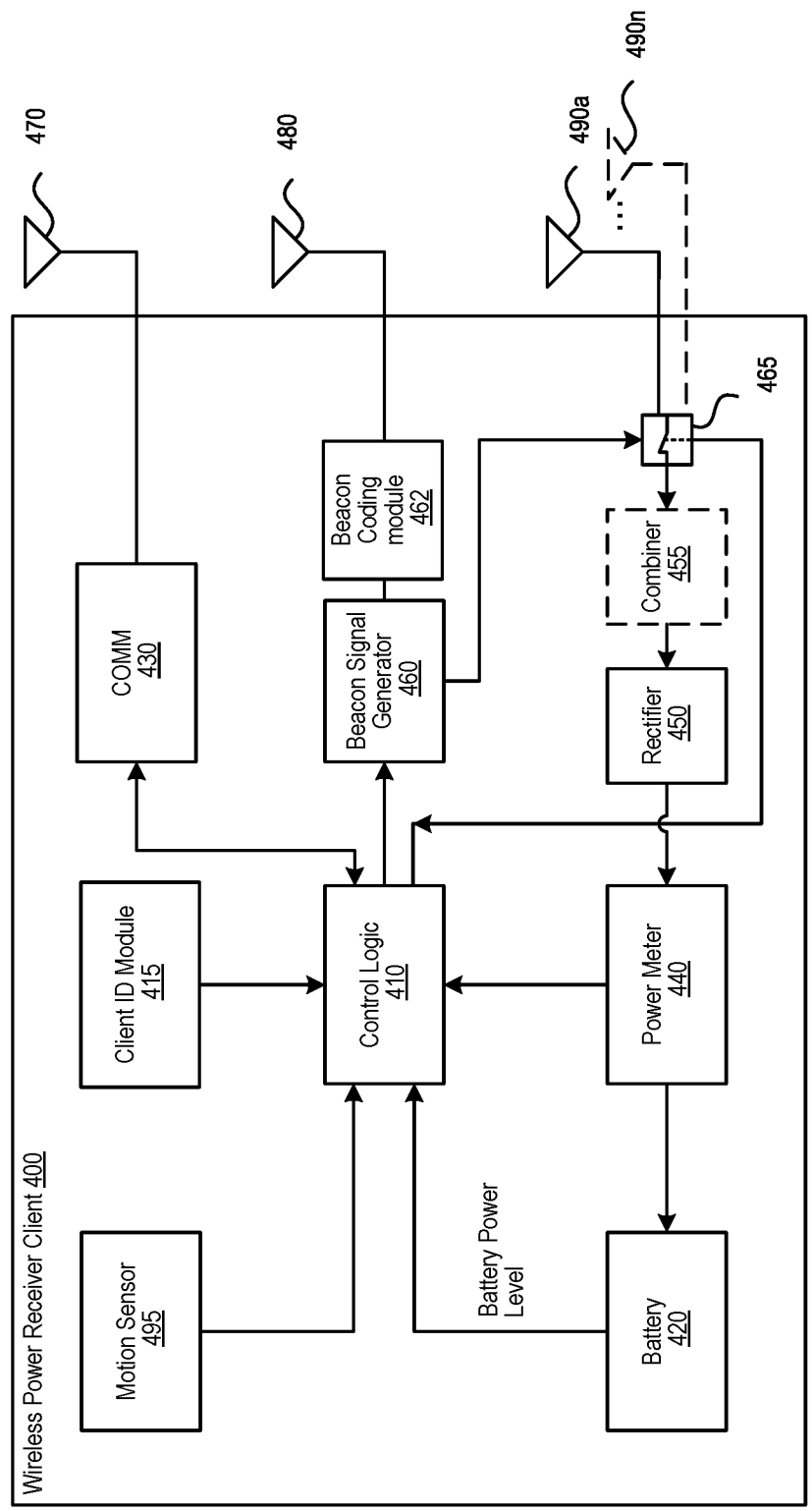
FIG. 4 depicts a block diagram illustrating example components of a wireless power receiver (client) in accordance with some embodiments.

FIG. 4 is a block diagram illustrating example components of a wireless power receiver (client), in accordance with some embodiments. As illustrated in the example of FIG. 4, the receiver 400 includes control logic 410, battery 420, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver is embedded. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. The power meter 440 measures the received power signal strength and provides the control logic 410 with this measurement.

The control logic 410 also may receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown for as charged by and providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, a client identifier (ID) module 415 stores a client ID that can uniquely identify the power receiver client in a wireless power delivery environment. For example, the ID can be transmitted to one or more chargers when communication are established. In some embodiments, power receiver clients may also be able to receive and identify other power receiver clients in a wireless power delivery environment based on the client ID.

An optional motion sensor 495 can detect motion and signal the control logic 410 to act accordingly. For example, when a device is receiving power at high frequencies, e.g., above 500 MHz, its location may become a hotspot of (incoming) radiation. Thus, when the device is on a person, e.g., embedded in a mobile device, the level of radiation may exceed acceptable radiation levels set by the Federal Communications Commission (FCC) or other medical/industrial authorities. To avoid any potential radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

Figure 5A:
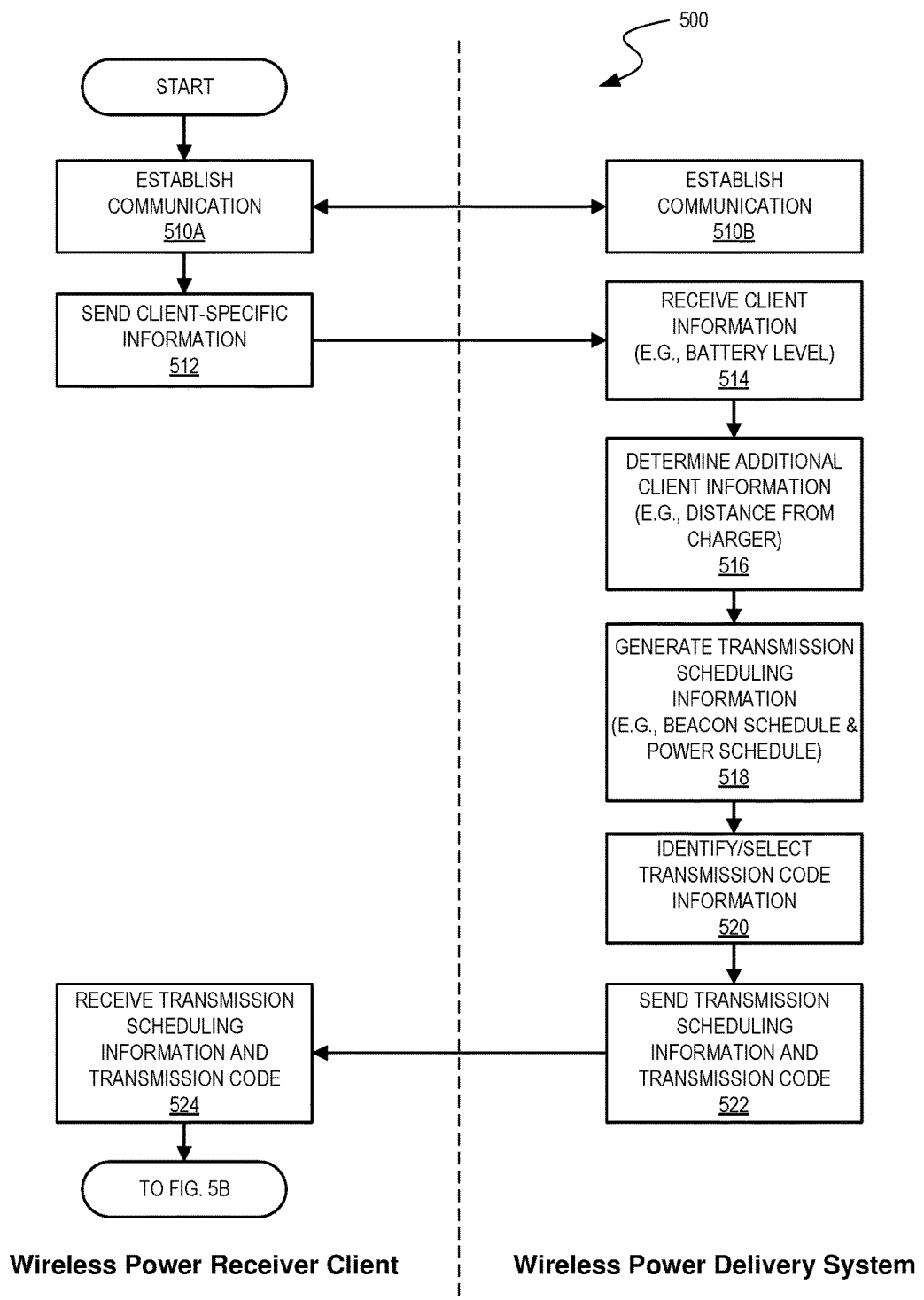
FIGS. 5A-5C depict a flow diagram illustrating an example process of encoding beacon signals for isolating a power receiver client for wireless power delivery in accordance with some embodiments.
Figure 5B:
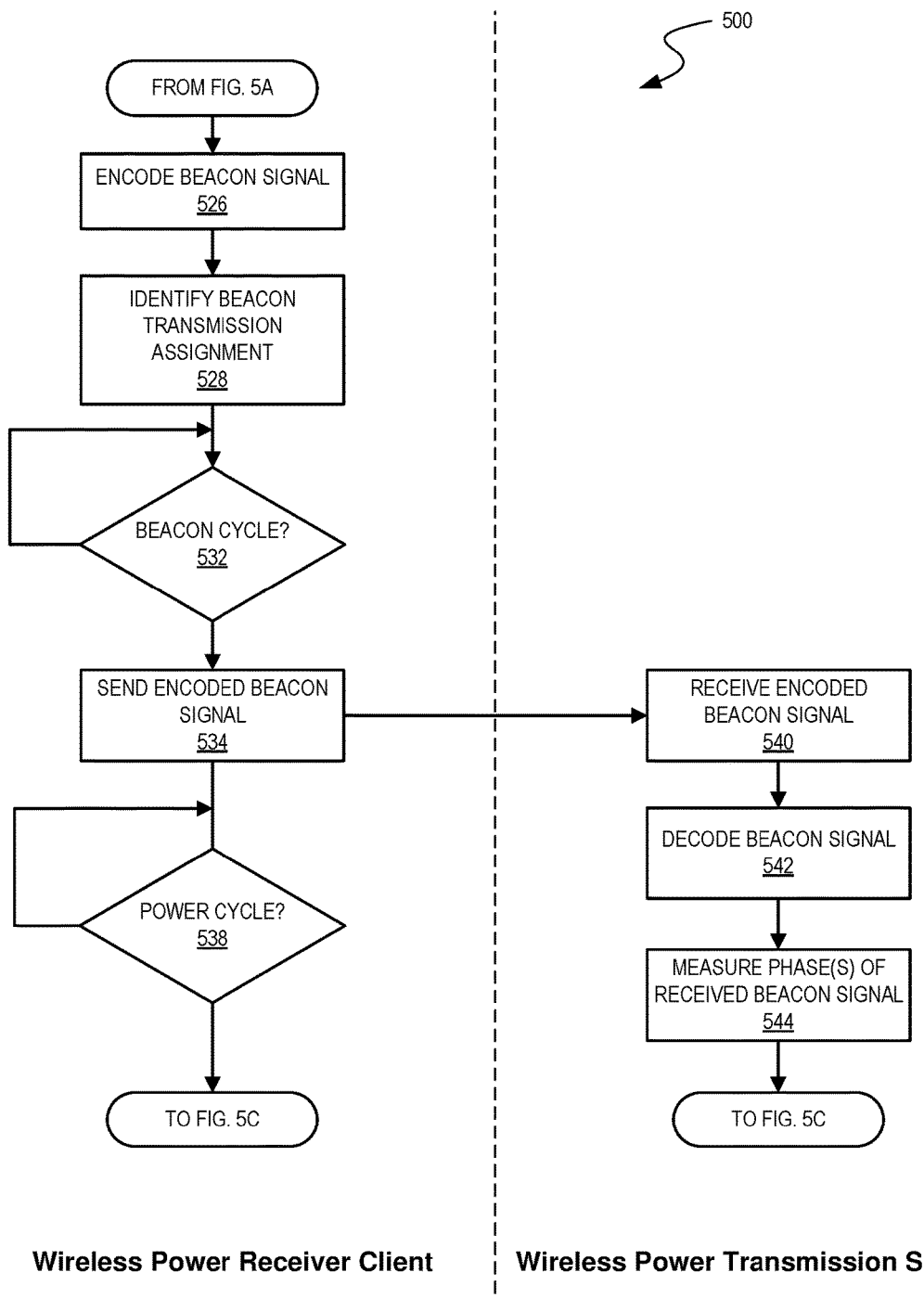
Figure 5C:
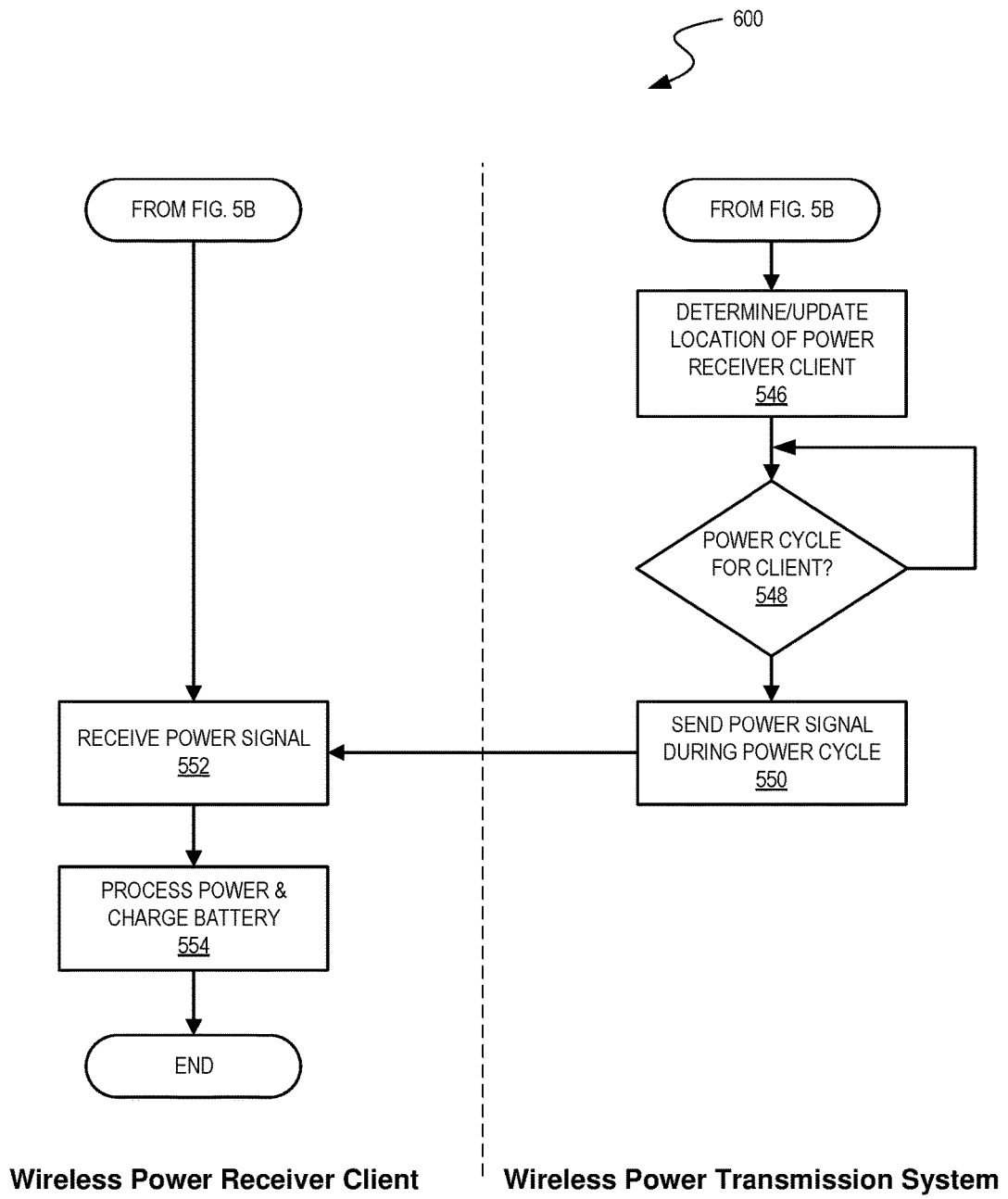

FIGS. 5A-5C depict flow diagrams illustrating an example process 500 for encoding beacon signals to isolate a power receiver client for wireless power delivery in accordance with some embodiments. A wireless device having an embedded wireless power receiver client and a wireless power delivery system can, among other functions, perform the corresponding steps of example process 500. The wireless power delivery system can be a wireless charger or components of a wireless charger, e.g., a wireless charger 101 of FIG. 1 or wireless charger 300 of FIG. 3, and/or a processing system, e.g., control logic 310 of FIG. 3. Likewise the wireless power receiver client can be wireless power receiver 103 of FIG. 1, wireless power receiver client 400 of FIG. 4 or various components of a wireless power receiver client. Alternative configurations are also possible.

To begin, at steps 510A and 510B, communication is established between the wireless power receiver client and the wireless power delivery system. As discussed above, in some embodiments, the wireless power delivery system can enter a default "discovery" mode to identify available wireless power receiver clients within range of the charger. When a client is found, the antenna elements on the charger array power on, enumerate, and (optionally) calibrate. The communication with the wireless power receiver client can be over one or more antennas of the multiple antennas of the wireless power delivery system. In some embodiments, a single antenna is used to establish communications with wireless power receiver clients.

Once communication is established between the wireless power receiver client and the wireless power delivery system, at step 512, the wireless power receiver client gathers and sends client-specific information to the wireless power delivery system. As discussed above, the client-specific information can include various properties and/or requirements corresponding to the power receiver client or wireless device in which the power receiver client is embedded. For example, the client-specific information can include, but is not limited to, battery level of the wireless device in which the power receiver client is embedded, battery level of the power receiver client, battery usage information, temperature information, etc. As discussed herein, the temperature information can include current temperature of the wireless device or wireless power receiver or, ambient temperature of the wireless device or wireless power receiver.

At step 514, the wireless power delivery system receives the client-specific information for the available wireless power receiver clients within range of the wireless power delivery system, e.g., charger. Once the client-specific information is received, the wireless power delivery system, at step 516, determines and/or otherwise identifies additional information about the wireless power receiver clients. The additional information can be any information that the wireless power delivery system can glean or otherwise obtain from the client. For example, the wireless power delivery system can determine the distance or range between the client and the wireless power delivery system based on the received signal strength indication (RSSI). The RSSI can be measured by the wireless power delivery system or measured and received from the client. The RSSI can also be an indicator of efficiency. Other distance determination methodologies are also possible. Furthermore, it is appreciated that the additional information can comprise other information obtained by the wireless power delivery system.

At step 518, the wireless power delivery system generates transmission scheduling information based on various predetermined priorities which can include the client-specific information and other information gleaned by the wireless power delivery system, e.g., distance to the wireless power delivery system. As discussed above, generating the transmission scheduling information can include: selecting a set (or subset) of the available wireless power receiver clients within range of the wireless power delivery system and generating beacon transmission scheduling information and power delivery scheduling information for the selected set of wireless power receiver clients. The beacon transmission scheduling information can comprise a BBS cycle. The power delivery scheduling information can comprise a power schedule (PS) for the selected wireless power receiver clients.

At step 520, the wireless power delivery system identifies and/or otherwise selects transmission code information. In some embodiments, the transmission code can comprise a pseudo-random sequence that is used by clients to modulate beacon signals so that the wireless power delivery system can identify and/or otherwise isolate the client device for wireless power delivery. As discussed herein, a unique transmission code can be selected for each wireless device that is scheduled to receive wireless power. Alternatively, a transmission code can be selected that is unique to a particular wireless power delivery system. Once selected, at step 522, the wireless power delivery system sends the transmission scheduling information and the transmission code to the wireless power receiver client.

At step 524, the wireless power receiver client receives the transmission scheduling information and the transmission code and, at step 526, encodes a beacon signal based on the transmission code. It is appreciated that various modulation schemes can be used to encode the beacon signal such as, but not limited to, frequency-shift keying, amplitude-shift keying, phase-shift keying, quadrature modulation schemes, m-ary modulation schemes, etc. For purposes of illustration, the examples described herein primarily discuss encoding of a beacon signal using phase-shift keying or other phase modulation techniques. Phase-shift keying is a digital modulation scheme that conveys data by changing, or modulating, the phase of a reference signal (the carrier wave). In some embodiments, the beacon signal is changed or modulated based on the pseudorandom sequence (or transmission code).

For example, the sequence can comprise a binary number in which every "1" in the sequence corresponds to a certain predetermined degree of phase shift. The predetermined degree of phase shift can be defined by the wireless power delivery system and communicated to the wireless power receiver client during initial communications. Alternatively, the predetermined degree of phase shift can be pre-defined in other ways and/or hardcoded in the device or embedded power receiver client. Likewise, in this example, every "0" in the sequence can correspond to a zero degree phase shift in that particular section of the signal. For example, if the pseudorandom sequence is "101010110 . . . 1", the wireless power receiver client can phase shift the beacon it broadcasts in a manner that matches that sequence. This allows the charger to identify the client and proceed with the wireless power delivery as illustrated in the sections below.

In some embodiments, encoding the beacon signal comprises phase modulating or phase shifting the beacon signal. Phase modulation is a modulation pattern that encodes information as variations in the instantaneous phase of a carrier wave. For example, after receiving the pseudorandom sequence sent by the charger, the selected wireless receiver can phase-modulate a beacon signal based on the pseudorandom sequence.

By way of example, if the pseudo-random sequence (called the modulating or message signal) is represented by $m(t)$ and the carrier onto which the signal is to be modulated is $c(t)=A_c \sin(\omega_c t+\phi_c)$. then the modulated signal can be represented as $y(t)=A_c \sin(\omega_c t+m(t)+\phi_c)$.

As discussed above, various modulation or coding schemes can be used to encode the beacon signals including combinations or variations thereof.

At step 528 the wireless power receiver client processes the transmission scheduling information to identify a beacon transmission assignment assigned to the wireless power receiver client and, at decision step 532, the wireless power receiver client monitors for the assigned beacon cycle. If the beacon cycle is detected, at step 534, the wireless power receiver client sends the encoded beacon signal to the wireless power delivery system and, at decision step 538, the wireless power receiver client monitors for the assigned power cycle. If the client device determines that its power cycle is approaching then it will listen or otherwise wait to receive power during the cycle. In some embodiments, the client device can preserve power by only "listening" during its prescribed power cycle.

At step 540, the wireless power delivery system receives the encoded beacon signal and, at step 542, decodes the beacon signal. For example, if the beacon signal is phase modulated, then the beacon signal is demodulated at step 542. At step 544, the wireless power delivery system measures the phases of the received beacon signal. For example, At step 546, the wireless power delivery system determines the relative location of the power receiver client within the wireless power delivery environment based, at least in part, on the measured phases. As discussed herein, the power receiver clients can be tracked through the wireless power delivery environment based on beacon signals which are periodically transmitted based on the BBS. Authorized clients embed transmission codes into their beacons so that the wireless power delivery system does not confuse them with unauthorized devices, e.g., a rogue device transmitting at the same frequency as an authorized client device but either not currently selected for wireless power delivery or an interference source, e.g., another charger, Wi-Fi router, etc. Additionally, in some embodiments, if the authorized client embeds a code onto its beacon, then the wireless power delivery system can identify the location(s) of the interference sources, e.g., unauthorized transmitters, and avoids locking onto those interference sources. In some embodiments, the charger can track the locations of the interference sources to ensure that they are not confused with authorized transmitters.

At decision step 548, the wireless power delivery system determines if the power cycle for the particular wireless power receiver client is active and, if so, at step 550 sends a coherent power signal to the wireless power delivery client during the power cycle as described herein. Lastly, at step 552, the wireless power receiver client receives the power signal and, at step 554 processes the power to charge one or more batteries as described herein.

Figure 6:
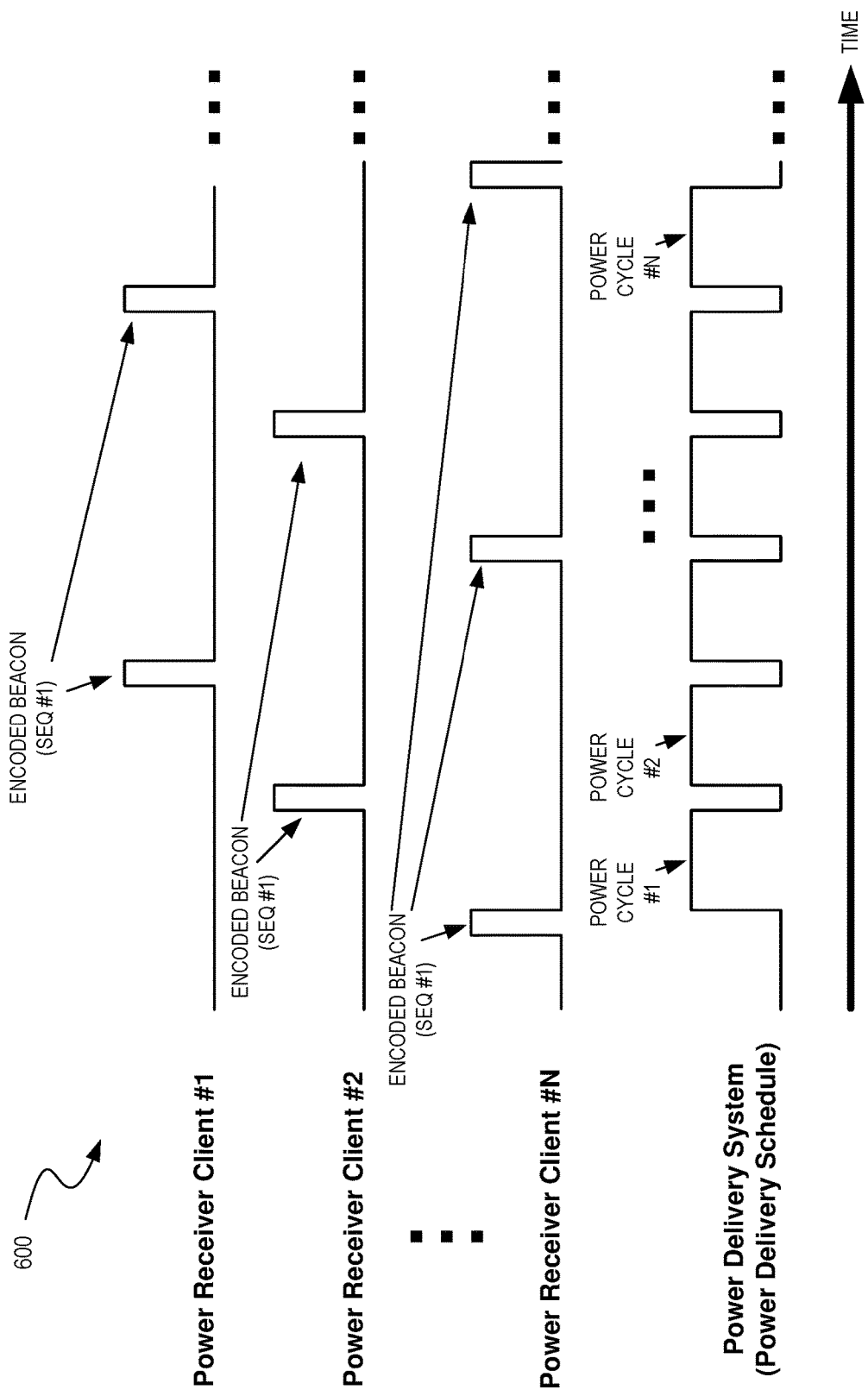
FIGS. 6 and 7 are signaling diagrams illustrating example transmission schedules, according to some embodiments.

FIG. 6 is a signaling diagram illustrating example transmission schedule 600 for multiple power receiver clients #1-#N and a wireless power delivery system in a wireless power delivery environment, according to some embodiment. The example transmission schedule 600 involves use of a single pseudorandom sequence. Although a single charger is shown in the example of FIG. 6, it is appreciated that the wireless power delivery environment can include multiple wireless power receiver clients.

As illustrated in the example of FIG. 6, the power delivery schedule can include an indication of the power delivery shares (or cycles) assigned to each of the selected clients. As described herein, the charger detects the phase modulated beacon based on the pre-identified pseudorandom sequence communicated to the selected client and schedules power delivery based on a predefined schedule referred to here as Beacon Beat Schedule ("BBS").

As discussed above, communication is first established between the wireless power delivery system ("charger") and the various power receiver clients #1-#N in a wireless power delivery environment. The wireless power delivery system then generates transmission scheduling information which can include beacon scheduling information and power scheduling information. The beacon scheduling information can include a "Beacon Beat Schedule." The BBS cycle schedules and organizes power delivery/beacon broadcasting between the charger and the clients in the environment. As discussed herein, generation of the transmission schedule can include selection of devices if there are more than a threshold number of devices (e.g., thirty) in the wireless power delivery environment. Additionally, one or more devices can be placed on a "waitlist."

Once the transmissions scheduling information is generated, the wireless power delivery system provides the transmission scheduling information and a transmission code, e.g., a pseudorandom sequence to the power receiver clients in the wireless power delivery environment. In some embodiments, only relevant scheduling information (e.g., scheduling or assignment information for a particular power receiver client) may be provided to the particular power receiver client. Alternatively, all or just portions of the scheduling information may be provided to the power receiver clients.

Since only one unique pseudorandom sequence is used by the wireless power delivery system in the example of FIG. 6, the wireless power delivery system schedules every client, e.g., #1-#N to broadcast its encoded beacon (e.g., phase modulated) at different times. This schedule guarantees power delivery for the clients. However, when many clients (e.g., thirty or more) have to share a limited number of cycles per second (e.g., one hundred cycles per second), the clients may end up with limited beacons each second (approximately three beacons for thirty clients in a system with one hundred cycles per second). The limited cycles can potentially limit the amount of wireless power the devices receive by leaving the power receiver clients out of their power delivery focus for relatively long periods of time. Moreover, tracking movement of the client with fewer beacons per second can result in potentially "locking" onto an unauthorized source the granularity of a moving device decreased. It is appreciated that each system may have more or fewer than one hundred cycles per second.

Figure 7:
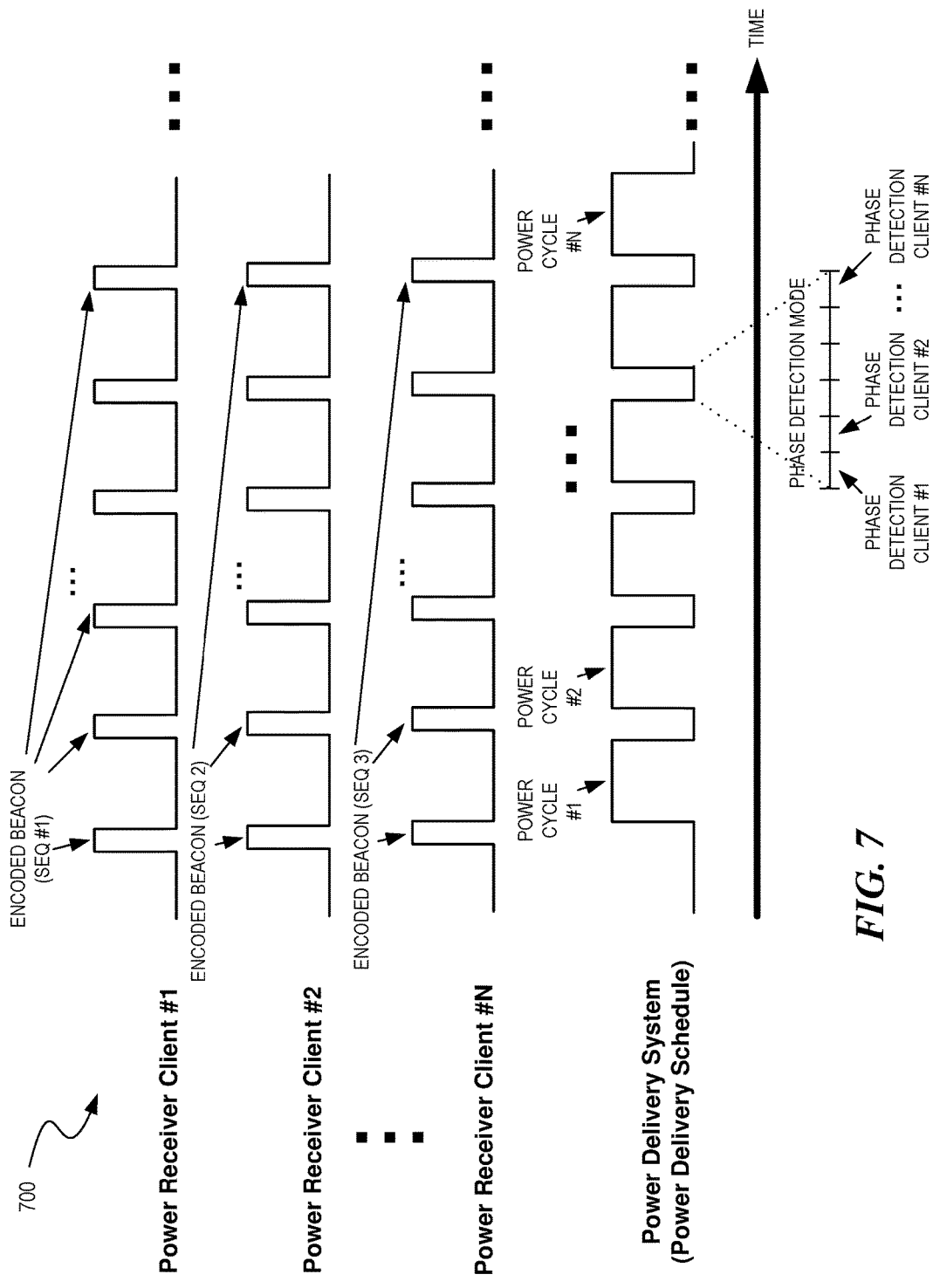

FIG. 7 is another signaling diagram illustrating example transmission schedule 700 for multiple power receiver clients #1-N and a wireless power delivery system in a wireless power delivery environment, according to some embodiment. The example transmission schedule 700 involves use of a multiple pseudorandom sequences. Although a single charger is shown in the example of FIG. 7, it is appreciated that the wireless power delivery environment can include multiple wireless power receiver clients.

The example of FIG. 7 is similar to the example of FIG. 6 except that the wireless power delivery system, e.g., charger issues and/or otherwise assigns a different transmission code e.g., pseudorandom sequence, to each client for use as their beacon encoding scheme along with its scheduled slot to broadcast the modulated beacon. Advantageously, when unique transmission codes are used for each client, the beacon transmission schedule can direct the clients to transmit their encoded beacons simultaneously or near simultaneously. This scheme can increase quantity of the beacons that the devices send to the charger per second which decreases the likelihood that the charger inadvertently locks on to an unauthorized source The client broadcasts the encode beacon, e.g., phase-modulated beacon, utilizing the provided transmission code (pseudorandom sequence). The wireless power delivery system, e.g., charger, detects the phase modulated beacons based on the assigned transmission code (e.g., pseudorandom sequence) and schedules power delivery based on a predefined power schedule which can also be provided to clients as discussed herein. In this example, the charger has a phase detection mode before each power cycle. As shown, the phase detection mode (also referred to as an encoded beacon detection mode) can be divided into chunks corresponding to each client. Alternatively, in some embodiments, the phases can be detected simultaneously by the charger.

In some embodiments, the examples described herein assume accurate time clock alignment approaching accuracy in the range of 1-in-a-billion accuracy or a 1 part per billion (ppb) variation. In some embodiments, the power receiving clients can therefor adjust internal clocks to align with the power delivery cycle of the charger for efficient power delivery. Alternatively or additionally, since the clients send tones (as part of beacon signal) for a known duration and at an expected rate, the charger can determine if a client's clock is fast or slow by measuring the actual tone signal received. The charger can then send an adjustment value for the client to apply to its system clock.

In the examples discussed herein the embodiments can include a data communication module, which can be used to coordinate events. Additionally, in some embodiments the beacon signal, which is primarily referred to herein as a continuous waveform, can alternatively or additionally take the form of a modulated signal.

Figure 8:
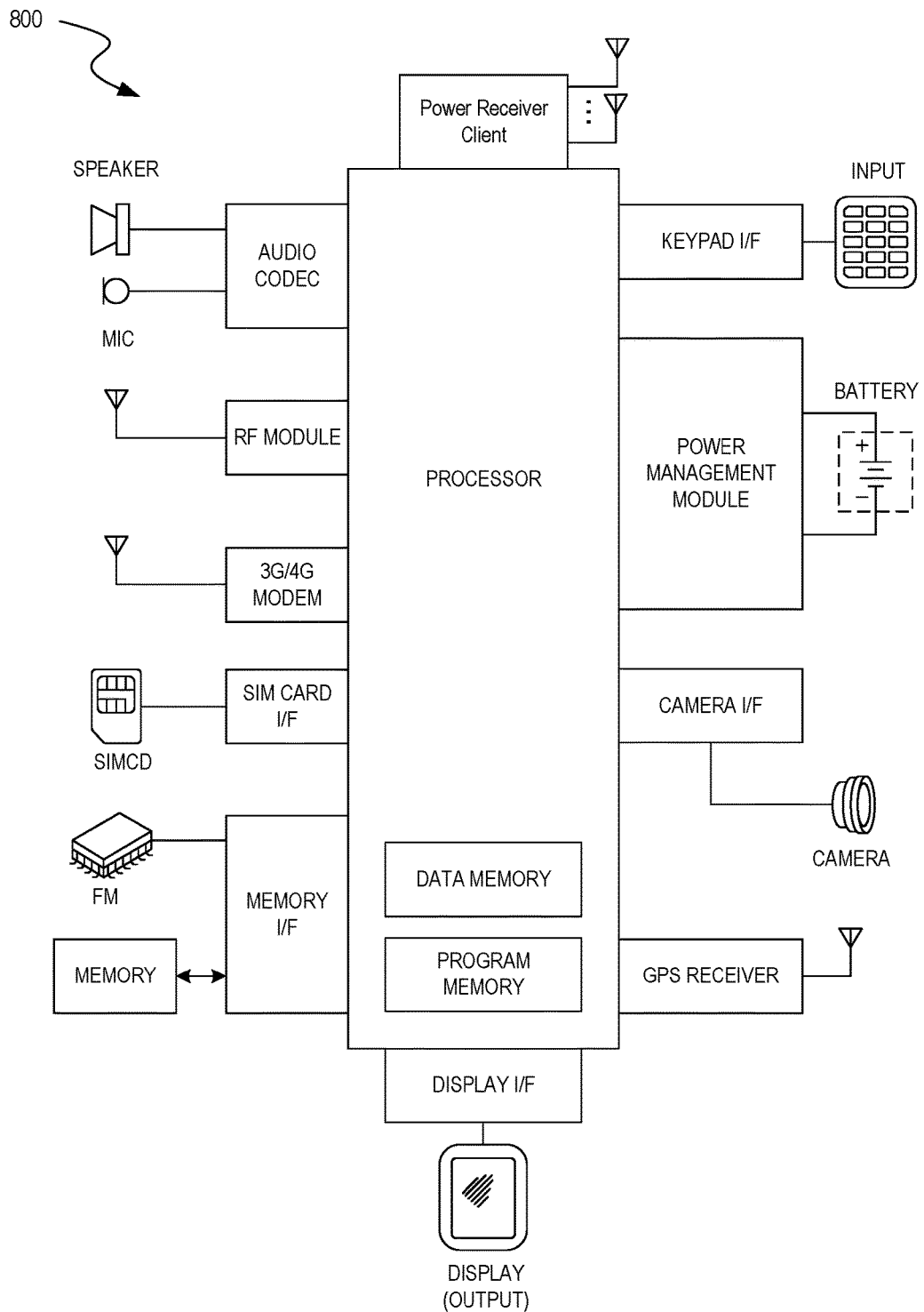
FIG. 8 depicts a block diagram illustrating example components of a representative mobile device or tablet computer with a wireless power receiver or client in the form of a mobile (or smart) phone or tablet computer device, according to some embodiments.

FIG. 8 depicts a block diagram illustrating example components of a representative mobile device or tablet computer 800 with a wireless power receiver or client in the form of a mobile (or smart) phone or tablet computer device, according to an embodiment. Various interfaces and modules are shown with reference to FIG. 8, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 9:
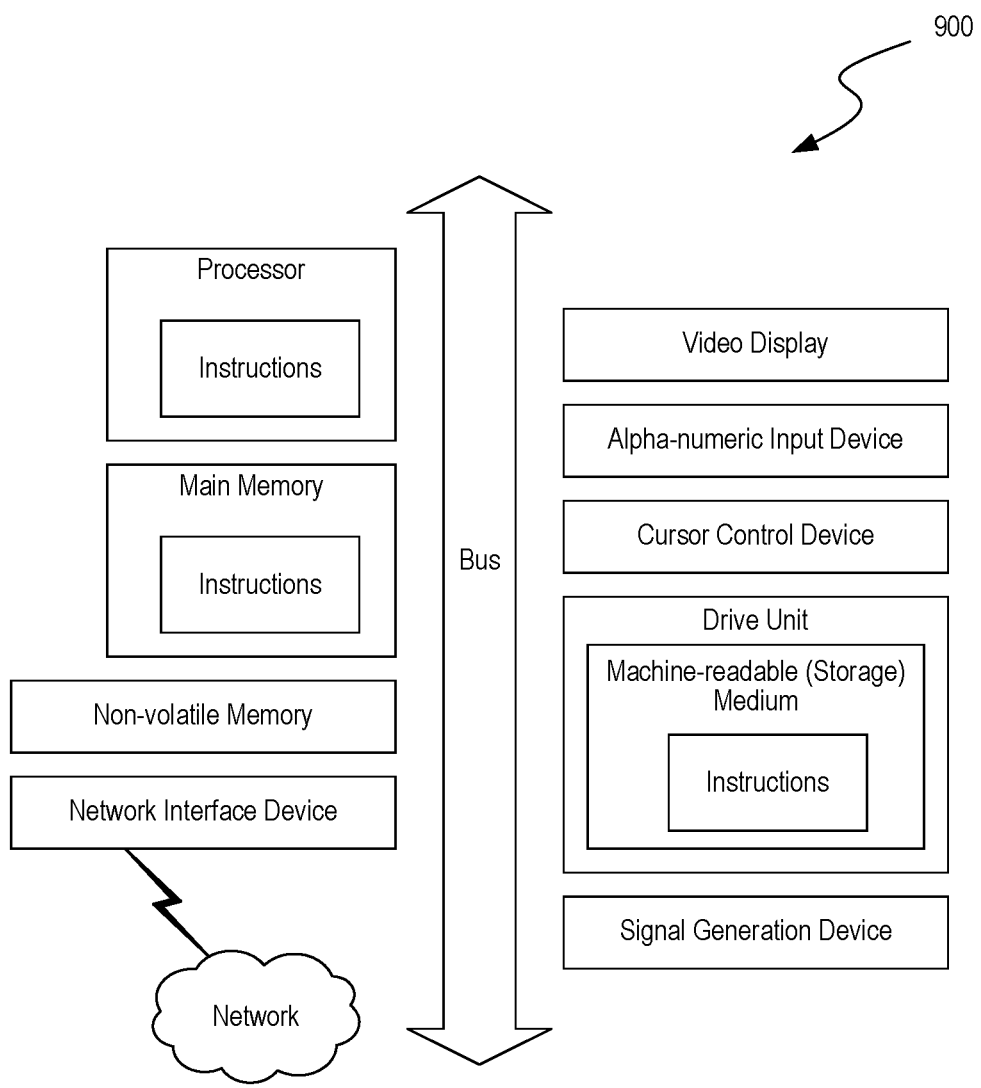
FIG. 9 depicts a diagrammatic representation of a machine, in the example form, of a computer system within which a set of instructions, for causing the machine to perform any one or more of the methodologies discussed herein, may be executed.

FIG. 9 depicts a diagrammatic representation of a machine, in the example form, of a computer system within which a set of instructions, for causing the machine to perform any one or more of the methodologies discussed herein, may be executed.

In the example of FIG. 9, the computer system includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶ 16, other aspects may likewise be embodied as a means-plus-function claim, or in other forms, such as being embodied in a computer-readable medium. (Any claims intended to be treated under 35 U.S.C. § 112, ¶ 16 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A wireless power delivery system comprising:
    means for establishing a wireless communications link with client devices in a wireless power delivery environment;
    means for processing client-specific information received from the client devices to select a set of the client devices for power reception in the wireless power delivery environment; and
    means for sending a transmission code to each of the selected set of client devices, wherein the transmission code is used to isolate signals transmitted from the selected set of client devices.

2. The wireless power delivery system of claim 1, wherein the wireless power delivery system further comprises:
    means for selecting a unique transmission code for each client device of the selected set of client devices.

3. The wireless power delivery system of claim 1, wherein the transmission code is unique to the wireless power delivery system.

4. The wireless power delivery system of claim 1, wherein the transmission code comprises a pseudo-random sequence.

5. The wireless power delivery system of claim 1, wherein the wireless power delivery system further comprises:
    means for decoding a coded beacon signal received from a particular client device to determine whether the particular client device is an authorized device, wherein authorized devices are included in the selected set of client devices.

6. The wireless power delivery system of claim 5, wherein the wireless power delivery system further comprises:
    means for measuring phases at which the coded beacon signal is received at one or more of the multiple antennas, wherein one or more of the multiple antennas are radio frequency adaptively-phased antennas configurable to direct wireless power to individual client devices in the wireless power delivery environment;
    means for determining or update location information corresponding to the client device based on the measured phases; and
    means for adjusting the adaptively-phased antennas to direct wireless power to the particular client.

7. The wireless power delivery system of claim 1, wherein the wireless power delivery system further comprises:
    means for processing the client-specific information received from the wireless devices to generate power transmission scheduling information; and
    means for sending the power transmission scheduling information to the selected set of client devices.

8. The wireless power delivery system of claim 1, wherein wireless power delivery system further comprises:
    means for generating beacon transmission scheduling information, wherein the beacon transmission scheduling information includes beacon transmission scheduling assignments for the selected set of client devices.

9. A wireless power transmission system comprising:
    an adaptively-phased antenna array including multiple antennas;
    control circuitry operatively coupled to the multiple antennas and adapted to:
        detect, at one or more of the multiple antennas, beacon signals broadcast by power receiver client devices in a multi-path wireless power delivery environment, wherein at least one of the beacon signals is encoded using a transmission code that isolates the at least one beacon signal from other beacon signals transmitted by the wireless power receiver client devices in the multi-path wireless power delivery environment;

decode the at least one beacon signal to:
isolate a location of the wireless power receiver client in a multi-path wireless power delivery environment, and
determine that a wireless power receiver client that transmitted the at least one beacon signal is authorized to receive wireless power from the wireless power transmission system; and responsively direct one or more of the multiple antennas of the adaptively-phased antenna array to transmit directed wireless power to the location of the wireless power receiver client in the multi-path wireless power delivery environment.

10. The wireless power transmission system of claim 9, wherein the control circuitry is further adapted to:
establish a wireless communications link with one or more wireless power receiver client devices in the wireless power delivery environment via at least one of the multiple antennas;
process client-specific information received from the wireless power receiver client devices to select a set of the wireless power receiver client devices for wireless power reception; and
direct at least one of the multiple antennas to send a transmission code to each of the selected set of wireless power receiver client devices.

11. The wireless power transmission system of claim 10, wherein the control circuitry is further adapted to:
generate a beacon transmission schedule including beacon transmission scheduling assignments for the selected set of wireless power receiver client devices; and
direct at least one of the multiple antennas to send the beacon transmission schedule to each of the selected set of wireless power receiver client devices.

12. The wireless power transmission system of claim 10, wherein the wireless power receiver client that transmitted the at least one beacon signal is authorized to receive wireless power from the wireless power transmission system when the wireless power receiver client belongs to the selected set of wireless power receiver client devices.

13. The wireless power transmission system of claim 10, wherein the control circuitry is further adapted to:
select a unique transmission code for each of the selected set of wireless power receiver client devices.

14. The wireless power transmission system of claim 9, wherein the transmission code uniquely identifies the wireless power transmission system.

15. The wireless power transmission system of claim 9, wherein the transmission code comprises a pseudo-random sequence.

16. The wireless power transmission system of claim 9, the encoded beacon signal is phase-modulated based on the transmission code.

17. A wireless power transmission system comprising:
an adaptively-phased antenna array including multiple antennas;
control circuitry operatively coupled to the multiple antennas and adapted to:
detect, at one or more of the multiple antennas, reception of a beacon signal broadcast by a first wireless power receiver apparatus of a set of wireless power receiver apparatuses selected for wireless power delivery,
wherein the beacon signal is encoded using a transmission code;
decode the beacon signal to isolate the first wireless power receiver apparatus; and
responsive to reception of the beacon signal, direct one or more of the multiple antennas of the adaptively-phased antenna array to transmit directed wireless power to the first wireless power receiver apparatus.

18. The wireless power transmission system of claim 17, wherein the control circuitry is further adapted to determine, based on the transmission code, that the first wireless power receiver client is authorized to receive wireless power.

19. The wireless power transmission system of claim 17, wherein the control circuitry is further adapted to select a unique transmission code for each wireless power receiver apparatus of the set of wireless power receiver apparatuses.

20. The wireless power transmission system of claim 17, wherein the transmission code uniquely identifies the wireless power transmission system.

* * * * *